(12) United States Patent
Neder et al.

(10) Patent No.: US 11,635,317 B2
(45) Date of Patent: Apr. 25, 2023

(54) ULTRASOUND FLOW MEASUREMENT DEVICE WITH SIGNAL QUALITY MONITORING

(71) Applicant: DIEHL METERING GMBH, Ansbach (DE)

(72) Inventors: Frederik Neder, Wilhermsdorf (DE); Marcus Wetzel, Heilsbronn (DE); Alexander Hofmann, Sachsen (DE); Florian Herrmann, Dinkelsbuehl (DE); Andreas Madinger, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 301 days.

(21) Appl. No.: 17/063,790

(22) Filed: Oct. 6, 2020

(65) Prior Publication Data

US 2021/0270652 A1    Sep. 2, 2021

(30) Foreign Application Priority Data

Feb. 28, 2020 (DE) .......................... 202020000806.0
Aug. 5, 2020 (DE) .......................... 202020003345.6

(51) Int. Cl.
*G01F 1/66* (2022.01)
*G01F 1/667* (2022.01)

(52) U.S. Cl.
CPC .................................. *G01F 1/667* (2013.01)

(58) Field of Classification Search
None
See application file for complete search history.

(56) References Cited

U.S. PATENT DOCUMENTS

| 6,062,091 A | 5/2000 | Baumoel |
| 2010/0143157 A1 | 6/2010 | Ahonen et al. |
| 2012/0176864 A1* | 7/2012 | Karl ........................ G01S 7/539 |
| | | 367/89 |
| 2019/0170549 A1* | 6/2019 | Wetzel .................... G01F 1/667 |

FOREIGN PATENT DOCUMENTS

| DE | 19818053 A1 | 10/1998 |
| DE | 102017011861 A1 | 6/2019 |
| EP | 2196678 A1 | 6/2010 |

* cited by examiner

*Primary Examiner* — Harshad R Patel
(74) *Attorney, Agent, or Firm* — Laurence A. Greenberg; Werner H. Stemer; Ralph E. Locher

(57) ABSTRACT

An ultrasound flow measurement device has a vessel through which a fluid to be measured flows. An ultrasound measurement configuration with an ultrasound transducer is provided for measuring a propagation time of an ultrasound signal containing a plurality of periods along a measurement section that runs partly in a direction of flow. A controller determines a fluid flow on a basis of a propagation time measurement. The controller contains a memory, a first evaluator for determining a period duration of at least one of the periods of an ultrasound signal received after passing through the measurement section, a second evaluator for determining a spread value of a predetermined number of last received ultrasound signals, a comparator for comparing the spread value with a threshold value, and an actioning device for initiating a control action, assigned to the threshold value that has been exceeded, for the ultrasound flow measurement device.

15 Claims, 2 Drawing Sheets

ULTRASOUND FLOW MEASUREMENT DEVICE WITH SIGNAL QUALITY MONITORING

CROSS-REFERENCE TO RELATED APPLICATION

This application claims the priority, under 35 U.S.C. § 119, of German application DE 20 2020 000 806, filed Feb. 28, 2020, and DE 20 2020 003 345, filed Aug. 5, 2020; the prior application is herewith incorporated by reference in its entirety.

BACKGROUND OF THE INVENTION

Field of the Invention

The invention relates to an ultrasound flow measurement device, having a vessel through which a fluid to be measured is able to flow, an ultrasound measurement arrangement with at least one ultrasound transducer for measuring a propagation time of an ultrasound signal containing a plurality of periods along a measurement section that runs at least partly in the direction of flow, and a control device for determining a fluid flow on the basis of the propagation time measurement. The control device has a storage device, and a first evaluation device for determining the period duration of at least one of the periods of an ultrasound signal received after passing through the measurement section.

Ultrasound flow measurement devices, for example ultrasound-based water meters or gas meters, or as components of a heat meter device, are already known in principle from the prior art. Here, the flow of a flowing medium, usually a fluid, is determined by measuring the propagation times of ultrasound signals, for example as absolute propagation times and/or as propagation time differences. It is for example known practice to use a measurement section, which runs at least partly in the direction of flow of the fluid, where a propagation time difference method, for example, can be used to take an upstream measurement and a downstream measurement, the propagation times of which are subtracted from one another to determine a propagation time difference. Reference propagation times can also be used to determine a propagation time difference.

The propagation time of ultrasound signals can for example be determined by measuring the phase shift in the ultrasound waves between the sent ultrasound signal and the received ultrasound signal. Provision may be made here for example for a first ultrasound signal to be sent through the fluid in the opposite direction to a second ultrasound signal, relative to the direction of flow of the fluid. To avoid the problem of limitation of the measurable propagation time differences due to the periodic repetition of the phase position, propagation time measurement methods that allow absolute propagation time measurement were also proposed, where for example what are referred to as level and envelope curve methods are possible. Preferably, however, as for example proposed in published, non-prosecuted German patent application DE 198 18 053 A1, corresponding to U.S. Pat. No. 6,062,091, a marker in the ultrasound signal is used in order to detect the actual time of arrival of the leading edge of the ultrasound signal or of another point in the ultrasound signal. The marker can be a phase change marker, which is detected in the received ultrasound signal by detecting the phase change. By contrast, published, non-prosecuted German patent application DE 10 2017 011 861 A1 corresponding to U.S. patent publication No. 2019/0170549, proposes a method for determining the propagation time of an ultrasound signal in a flowing medium in which, to determine the position of the marker, the period duration of at least one selected period of the received ultrasound signal is measured. In other words, a modification of the period length is used as a marker therein.

In ultrasound flow measurement devices, in particular water meters and other liquid meters, various problems exist which can adversely affect propagation time measurement, in particular over a period duration. In addition to the temperature changing, but over a longer-term time scale, and electromagnetic interference from the surroundings which can be eliminated by shielding, a significant interfering factor in ultrasound-based flow measurement is cavitation. Cavitation refers to the formation and collapse of vapor-filled cavities in liquids. It has been shown that the ultrasound signals can be distorted even by minor incipient cavitation, in particular as far as the received ultrasound signal is concerned. Even small air bubbles, which are for example carried in the pipeline due to a leak, can lead to the ultrasound signals being distorted, which again has a negative effect on ultrasound-based flow measurement.

For pumps, a method and a system for detecting cavitation is proposed in European patent application EP 2 196 678 A1, corresponding to U.S. patent publication No. 2010/0143157. Here, the pump is controlled by a frequency converter which provides a torque estimate and/or a speed estimate for the motor of the pump, in order to derive therefrom one or more properties that are indicative of cavitation or the chance of cavitation. The control of the pump can then be adjusted accordingly.

For ultrasound flow measurement devices, there is no easily implementable procedure known to date that makes it possible to determine cavitation and/or other losses of signal quality of the ultrasound signals which could lead to a decrease in the reliability of ultrasound-based flow measurement.

BRIEF SUMMARY OF THE INVENTION

The object of the invention is therefore to specify an easily implementable and reliable option for detecting signal quality losses, in particular due to cavitation, in an ultrasound flow measurement device.

To achieve this object, an ultrasound flow measurement device with the features of the independent claim is provided according to the invention. Advantageous refinements become apparent from the dependent claims.

In an ultrasound flow measurement device of the type mentioned in the introduction, the control device further has the following according to the invention:

a second evaluation device for determining a spread value, in particular the standard deviation, for predefined period durations, determined using the first evaluation device, of a predetermined number of last received ultrasound signals, a comparison device for comparing the spread value with at least one threshold value, and an actioning device for initiating a control action, assigned to a threshold value that has been exceeded, for the ultrasound flow measurement device.

Since options are known for determining period durations, in particular also the duration of a certain period within the ultrasound signal containing a plurality of periods, from the received ultrasound signal, for which purpose the first evaluation device is provided, the present invention proposes measuring the signal quality of the received ultrasound signals by continuously measuring at least one period duration of a, for example sinusoidal, received ultrasound signal. Here, as known in principle, the ultrasound signal is transmitted from a transmitter to a receiver, where transmitter and receiver can be formed by one or two ultrasound transducer(s). If for example the same period of the received ultrasound signal is always measured, which for example can be a signal packet consisting of a plurality of periods, for example twelve sinusoidal oscillations, it can be assumed that under normal circumstances the period duration for consecutive measurement operations is not substantially changed since such measurement operations are very readily reproducible in the normal case. Therefore, an overly large variation in the period duration indicates that there is a deviation from the normal case. According to the invention, the second evaluation device is therefore provided in order to quantify the spread of the period durations determined by the first evaluation device from the measured received ultrasound signals, which period durations can be stored temporarily in the storage device, for example, in the form of the spread value. For example, the standard deviation of the period durations to be considered can be used, although other statistical characteristic values which describe the deviation from an average value can also be used.

According to the invention, it has now been found that a spread value of this type can be used as a metric for signal quality. The smaller the spread, the better the signal quality of the received ultrasound signals.

In an analysis it can be stated that, although various factors influencing the spread value of the measured period durations exist in principle, the main effect is caused by cavitation and/or any gas within the liquid to be measured as a fluid. Thus, although the period duration can change if the fluid temperature, and therefore also the transducer temperature, changes, short-term stability of the temperature in a measurement structure of an ultrasound flow measurement device can be assumed. Spread metrics, and therefore also the spread value, are virtually unaffected by slow offset drifts, however, such that cavitation detection is not significantly affected by temperature effects in real application scenarios.

The main cause of large spreads in the period duration in practice lies in cavitation in proximity to the ultrasound transducers, since even minor incipient cavitation significantly changes the form of the electrically picked up received ultrasound signal. Other gas inclusions, such as for example air bubbles due to a leak, can also lead to substantially varying period durations.

In ultrasound flow measurement devices, in particular water meters, cavitation can occur if the ultrasound flow measurement device was incorrectly dimensioned for the particular use. If ultrasound flow measurement devices are subjected to cavitation over a long period during field use, they will be mechanically damaged. The procedure according to the invention has the great advantage that no further sensors and no special hardware are required in order to detect cavitation or general signal disturbances and to react accordingly by means of the actioning device. In this way, the detection of signal disturbances, in particular due to cavitation, is made possible as standard without the complexity or unit cost of the ultrasound flow measurement device being appreciably increased. It is pointed out here that evaluation device, comparison device and actioning device can in principle be implemented at least partly as hardware and/or at least partly as software, but it is preferred for these means to be implemented at least partly using hardware components.

It can also be stated that the control device is configured to carry out the following steps:

determining the period duration of at least one of the periods of an ultrasound signal received after passing through the measurement section;

determining a spread value, in particular the standard deviation, for predefined, determined period durations of a predetermined number of last received ultrasound signals;

comparing the spread value with at least one threshold value; and if at least one of the at least one threshold values is exceeded, initiating a control action, assigned to the threshold value that has been exceeded, for the ultrasound measurement device.

In the context of the present invention, the at least one threshold value can ultimately be determined empirically or via calibration in such a way that overly high losses of signal quality can be sufficiently clearly differentiated from normal operation. For example, test measurements can be carried out using liquids containing air bubbles and liquids devoid of air bubbles. As will be explained in more detail, it is entirely conceivable for a plurality of threshold values to be used if, for example, there is a division into signal disturbances that can still be compensated for by modifying the measurement strategy and signal disturbances that can no longer be compensated for. Also, as will be explained in more detail, various control actions are conceivable, from modifying the measurement behavior to informing a user, for example the end user and/or an assigned supplier.

In a development of the present invention, the control device can further have a digitization device for digitizing the received ultrasound signal, the output of which is connected to an input of the first evaluation device. Corresponding digitization device are now also known in such an inexpensive and simple variant that use in ultrasound flow measurement devices is at least conceivable. For a digitized received ultrasound signal, the evaluation with respect to the period durations is significantly simplified, since no analog progression analysis has to be carried out. In particular, a digitized received ultrasound signal allows the period durations of all of the periods occurring in the ultrasound signal to be able to be determined by the first evaluation device. It is pointed out that not all of these period durations then necessarily have to be included in the determination of the spread value, however, in particular when a marker is put in place via a period modification. In general, however, it has also been shown to be expedient to always consider the same period of successive ultrasound signals with respect to the period duration, since there is the best and most reliable match here in normal operation, even if it can generally be assumed that the ultrasound signal is generated with a fixed, predetermined frequency which exhibits only slight fluctuations.

In principle and in general, it is also noted with respect to the ultrasound signal, which can also be referred to as an ultrasound burst, that it can preferably have a sinusoidal basic form and/or comprise in particular 8 to 15, for example 12, periods.

As already indicated, the first evaluation device can be designed to determine the period duration of exactly one defined period of the ultrasound signal or to determine the period duration of all of the periods, in particular in the case of a digitized received signal. It has been shown in the context of the invention that, in order to save effort, it can be sufficient to determine the period duration of a certain, predetermined period of the ultrasound signal as the only period duration per ultrasound signal, in order to keep the amount of data within limits too. For example, the sixth period or the like can be considered in principle.

In an expedient development of the present invention, provision may be made for a signal generation device of the control device to be configured to generate the ultrasound signal with a marker for determining the propagation time, which marker is detectable by a third evaluation device of the control device. A period duration modification can particularly advantageously be used as a marker here, in which case it is expedient, when using a period duration modification as a marker, to design the second evaluation device to exclude periods of the received ultrasound signal that contain the marker when determining the spread value. When using a period duration modification as a marker, there is the particular advantage that the means, in particular an evaluation circuit, for determining period durations of selected periods of the received ultrasound signals are already present, so no special hardware and/or sensor system is required in order to cost-effectively implement the ultrasound flow measurement device according to the invention. Known evaluation circuits, which, in addition to the mentioned third evaluation device, can then also at least partly embody the first evaluation device, in particular already allow a period duration to be measured very precisely with respect to a single received ultrasound signal, so that the measurement of hydraulic noise and flow noise is virtually unaffected.

As already mentioned, it can be advantageous if the second evaluation device is configured to use exactly one period duration of a predefined period for each ultrasound signal when determining the spread value, since in this regard, as has been shown, there are the smallest deviations in the period duration of different ultrasound signals with respect to one another in normal operation. It is of course also conceivable, in the context of the present invention, to use a plurality of period durations of different periods per received ultrasound signal over a constant or at least largely unchanging frequency within an ultrasound signal. Incidentally, developments of the present invention can also provide for a plurality of spread values to be considered, for example for different predefined periods within the received ultrasound signals. For example, individual outliers can thus be taken into account.

For example, the predetermined number can be 10 to 100, in particular 40 to 70. Sample numbers of successive received ultrasound signals within this range are usually sufficient to provide adequate statistics for assessment, the reliability of the statistics increasing and extremely short-term effects, for example individual air bubbles drifting past, becoming less significant as the predetermined number increases. A larger number of successive received ultrasound signals can also be considered, for example up to 1000 or even up to 2000.

It is noted at this point that, according to the invention, provision can be made for the second evaluation device to be configured to update the spread value with each newly available at least one period duration, i.e. each time an ultrasound signal is received, with the comparison device also expediently performing the comparison anew each time the spread value is updated. However, it is also conceivable in the context of the invention to provide a less frequent update, for example every 10 received ultrasound signals or 50% of the predetermined number of ultrasound signals.

The first evaluation device can be designed to determine the period duration by detecting rising edges. Other readily detectable points in the profile of the received ultrasound signal are of course also conceivable.

In an advantageous development of the present invention, provision may further be made for the at least one control action that can be performed by the actioning device to comprise switching the ultrasound flow measurement device from a normal operating mode to a second operating mode with modified measurement behavior. A particularly advantageous development therefore makes provision for the measurement behavior of the ultrasound flow measurement device to be adjusted for the signal quality represented by the spread value. For example, the measurement can be stopped entirely (if the signal quality is too poor) or it can be made more robust, in which case it is also conceivable, since the spread value represents a measure of the signal quality of the received ultrasound signals of course, to proceed in steps, i.e. to define a plurality of threshold values, i.e. ranges in which a certain measurement behavior is appropriate. It is particularly advantageous here to stop the measurement operation completely only in the event of severe problems. The measurement behavior relates in particular to the flow measurement; it is entirely conceivable in the context of the present invention to carry on determining period durations and therefrom the spread value. If this is the case, it can be expedient to adjust the measurement behavior suitably again when the signal disturbance disappears. In other words, provision can be made for the actioning device to be configured to switch back to the previous operating mode as the control action when there is a drop below a previously exceeded threshold value which led to switching to a second operating mode. Therefore, for example, if there is a short-term disturbance, more robust measurement can for example be performed in the second operating mode for this period of time, after which it is possible to switch back to the previous state, the normal operating mode, with the normal measurement behavior.

Specifically, provision can be made in the context of the present invention for the at least one second operating mode to be selected from the group containing:

a fail-safe operating mode with measurement performance that is reduced but that still meets a measurement quality requirement and with a more robust measurement operation with respect to signal quality losses, in particular through measurement range restriction and/or multiple measurement; and a deactivation mode, in which measurement is deactivated, and in particular deactivation operating mode information is output via an output interface.

It is thus possible for example, when a defined threshold value is exceeded by the spread value, to switch to a fail-safe operating mode or emergency operating mode, in which for example a measurement range expansion provided in the normal operating mode with respect to the period duration, i.e. for example the use of markers which relate to the period duration, is deactivated and, for example, the phase offset is used for measurement. Such a fail-safe operating mode can also be implemented by multiple measurements, since then too the reliability of the results is increased. Thus, the fail-safe operating mode or emergency operating mode can be regarded as more resistant to disturbances overall, since measurement errors can be dealt with via statistics and/or by substantially restricting the measurement range.

It is also possible, in particular when an upper threshold value is exceeded, to suspend the measurement operation, and consequently the accumulation of the volume that has flowed through, in order to prevent extremely skewed measurement signals from being used in the flow calculation.

As already mentioned, it is also particularly advantageously conceivable in this context for the comparison device to be configured to use at least two threshold values, where a lower threshold value is assigned to the fail-safe operating mode and an upper threshold value is assigned to the deactivation operating mode. As explained, the spread value is therefore understood here as a measure of the signal quality and processed in various steps in a manner adjusted to the signal quality.

Other actions are of course also conceivable in the context of the present invention, alternatively or in addition. A development of the present invention makes provision for at least one control action to comprise storing the exceedance in the storage device and/or outputting exceedance information via an output interface. It is therefore possible to provide a kind of "logging operation" from which it can be seen whether and when the at least one threshold value was exceeded. Simultaneously or alternatively, it is also conceivable to make provision for informing the end user and/or a supplier of the fluid to be measured, for example by means of an output device of the ultrasound flow measurement device, for example a corresponding light, and/or by means of a communication interface, via which the ultrasound flow measurement device is connected to a network, for example the Internet.

It is also pointed out here that it is also conceivable for such actions, whether "logging" and/or providing exceedance information, to be output only after a predetermined period of time for which the threshold value is exceeded, in order for example to exclude from such warnings or notifications disturbances that exist only for a short time and ultimately have no influence. In particular, such a control action can also be assigned only to the exceedance of certain threshold values when using a plurality of threshold values, since, for example, in a fail-safe operating mode, it can be assumed that the ultrasound flow measurement device is still operating with sufficient accuracy. Finally, it is pointed out that it is also conceivable in the context of the present invention to action an indirectly related output or indirectly related storage via a further actioning device of the control device. Thus, for example, when a fail-safe operating mode is activated, for example in the case of multiple measurements, increased power consumption can be determined, which can be explained by an increased spread value and the subsequent internal reaction in the ultrasound flow measurement device. However, a direct notification to the end user and/or the supplier is preferred so that, for example, cavitation can be detected and remedied promptly.

Since electromagnetic influences from other devices can also have an influence on the spread value or the signal quality, in an expedient development in the context of the present invention, provision can also be made for the ultrasound flow measurement device to have EMC shielding, in particular both for the ultrasound measurement arrangement and for the control device. Suitable shielding measures can therefore largely exclude external influences on the determination of the spread value.

Other features which are considered as characteristic for the invention are set forth in the appended claims.

Although the invention is illustrated and described herein as embodied in an ultrasound flow measurement device with signal quality monitoring, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
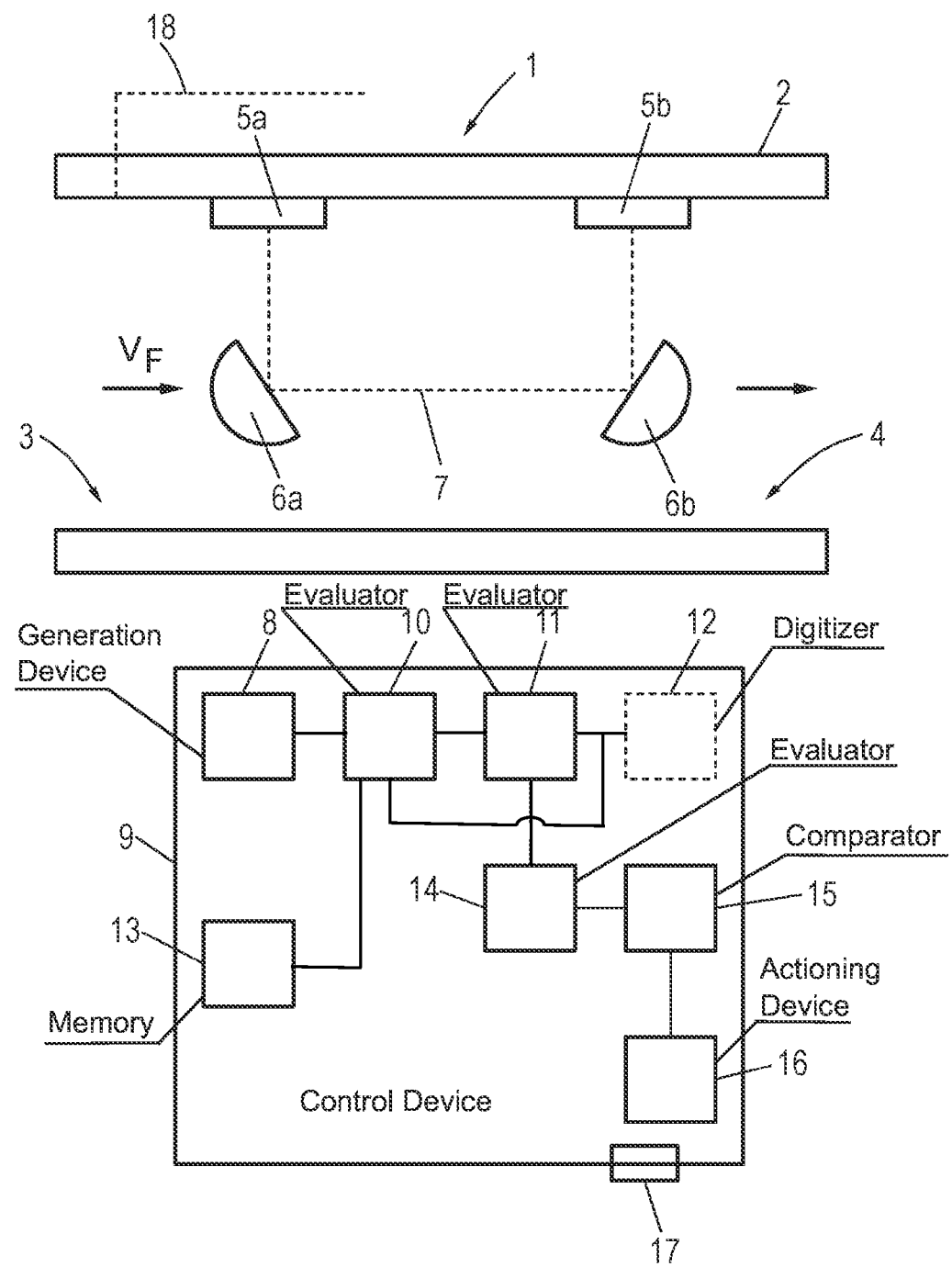
FIG. 1 is a basic schematic diagram showing an ultrasound flow measurement device according to the invention.

Referring now to the figures of the drawings in detail and first, particularly to FIG. 1 thereof, there is shown a basic schematic diagram of an ultrasound flow measurement device 1 according to the invention. It contains a vessel 2, for example a pipe section, through which a fluid, in particular a liquid, for example water, flows from an inflow 3 to an outflow 4 in the indicated direction of flow, which flow is to be measured. The ultrasound flow measurement device 1 can therefore be a water meter, for example.

The ultrasound flow measurement device 1 has a measurement arrangement, which in the present case has for example two ultrasound transducers 5a, 5b. The ultrasound transducers 5a and 5b are located in contact with the flowing fluid, the path of the ultrasound signals being deflected by the reflectors 6a and 6b provided by way of example, so that a U-shaped measurement section 7 is created in the present example. It can be seen that the measurement section 7 runs partly parallel to the direction of flow of the fluid. Ultrasound signals can be transmitted from one of the ultrasound transducers 5a, 5b in order to be received again by the other of the ultrasound transducers 5a, 5b.

The ultrasound signals can for example be generated here by a signal generation device 8 of a control device 9 controlling the operation of the ultrasound flow measurement device 1, for example as an ultrasound signal with twelve periods, which are provided by twelve sinusoidal oscillations. Of course, other numbers of periods are also conceivable in principle.

After passing through the measurement section 7, received ultrasound signals are also evaluated in the control device 9, in the present case for example by a third evaluation device 10, for example by detecting a marker in the received ultrasound signal and using same to determine an absolute propagation time in a normal operating mode of the ultrasound flow measurement device 1. The position of the marker in the received ultrasound signal can in particular here also be obtained by determining a period duration, see published, non-prosecuted German patent application DE 10 2017 011 861 A1. In this context, the third evaluation device 10 can share hardware and/or software components with a first evaluation device 11, which means specifically also determines the period duration of at least one predefined period of the received ultrasound signal, although for the purpose of checking signal quality, as will be explained in more detail below. In the case of marking via period duration modification, the signal quality checking arrangement with the first evaluation device 11 preferably does not use the period of the received ultrasound signal which was modified to place the marker.

Both the first evaluation device 11 and the third evaluation device 10 can here be connected to the output of an optional digitization device 12 which digitizes the received ultrasound signal in a manner known in principle and delivers it to the evaluation device 10, 11. The digitization makes it possible in particular to determine the period durations of all of the (complete) periods of the received ultrasound signal in a simple manner; it is noted that in general a rising edge of the received ultrasound signal is preferably detected for determining the period duration.

For signal quality monitoring, in particular with respect to cavitation, relevant period durations can be stored in a storage device 13 of the control device 9 for as long as they are relevant, which means can also be used for example for measurement results from flow measurement.

A second evaluation device 14 of the control device 9 is configured to determine a spread value which describes the spread over time, in the present case the standard deviation, of certain period durations, which were determined by the first evaluation device 11. For this purpose, a certain period of the received ultrasound signal which is not used as a marker is preferably always used, for example the seventh or ninth period. It is also conceivable to consider a plurality of predefined periods, either in one spread value or to determine a plurality of spread values for the various predefined periods. To determine the spread value, a predetermined number of successive received ultrasound signals is always used, for example 50 or 100.

The spread value, for example in the form of a spread value signal output by the second evaluation device, is compared with at least one threshold value in a comparison device 15, for example a comparator, of the control device 9, in order to be able to determine the presence of interference or a low signal quality. If at least one of the at least one threshold values is exceeded, control actions assigned to the exceeded threshold value are performed in an actioning device 16.

The control actions can include here switching from the normal operating mode to a second operating mode with modified measurement behavior, for example switching to a fail-safe operating mode (emergency operating mode) or even to a deactivation operating mode, in which flow measurement is suspended. A corresponding switch back is conceivable if an updated spread value subsequently drops back below the threshold value.

A preferred exemplary embodiment makes provision for two threshold values to be used, with a fail-safe operating mode initially being activated when the first, lower threshold value is exceeded, in which, for example by restricting the measurement range for the propagation time and/or using multiple measurements, a more robust measurement operation is implemented, which preferably nevertheless meets certain measurement quality requirements so that the flow measurement results can still be used to accumulate the volume that has flowed through. If the second, upper threshold value is exceeded, the signal quality is assumed to be so severely limited that meaningful, sufficiently reliable flow measurement is no longer possible, such that the measurement operation can be suspended. At least in the latter case, operating mode information, which informs an end user and/or a supplier, is expediently also output via an output interface 17 as a further control action, for example to control an output device of the ultrasound flow measurement device 1 and/or at another location that is accessible via a communication device. It is also possible to log exceedances of at least a portion of the at least one threshold value, for example at least after a determined period of time, in the storage device 13.

In other exemplary embodiments, there can also merely be provision for switching to the fail-safe operating mode or to the deactivation operating mode as a second operating mode; just the output of information to inform or to warn, in particular of cavitation, is also conceivable.

Incidentally, the exemplary embodiment according to FIG. 1 also includes EMC shielding 18, indicated only schematically in FIG. 1, around the ultrasound measurement arrangement and the control device 9 in order to exclude as far as possible influences due to electromagnetic interference on the period duration or the determination thereof.

Figure 2:
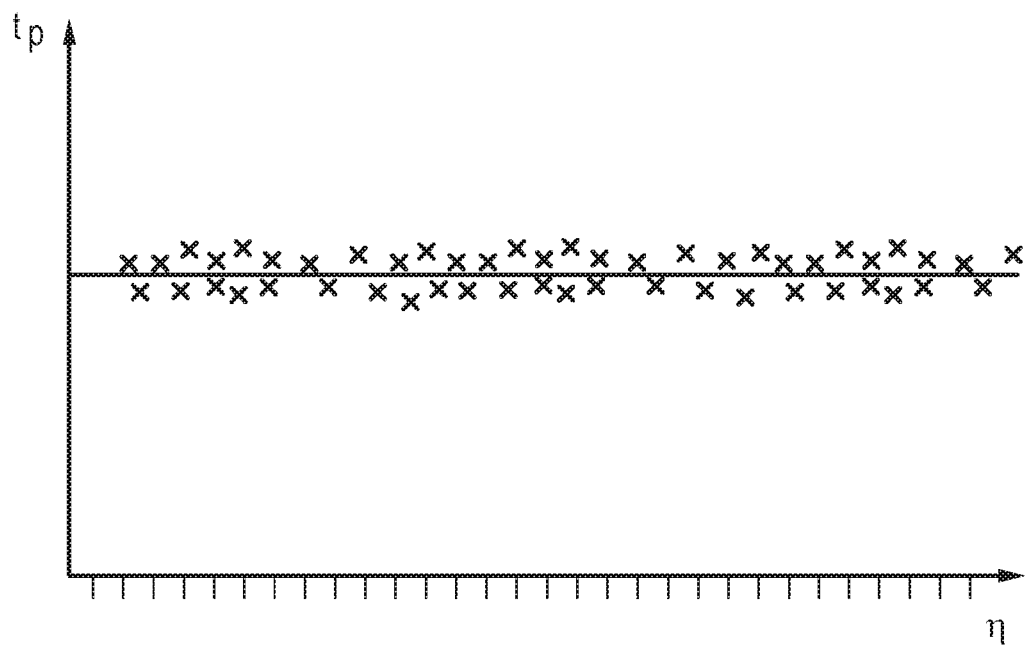
FIG. 2 is a graph showing a determination result for period durations in the case of a low spread value.
Figure 3:
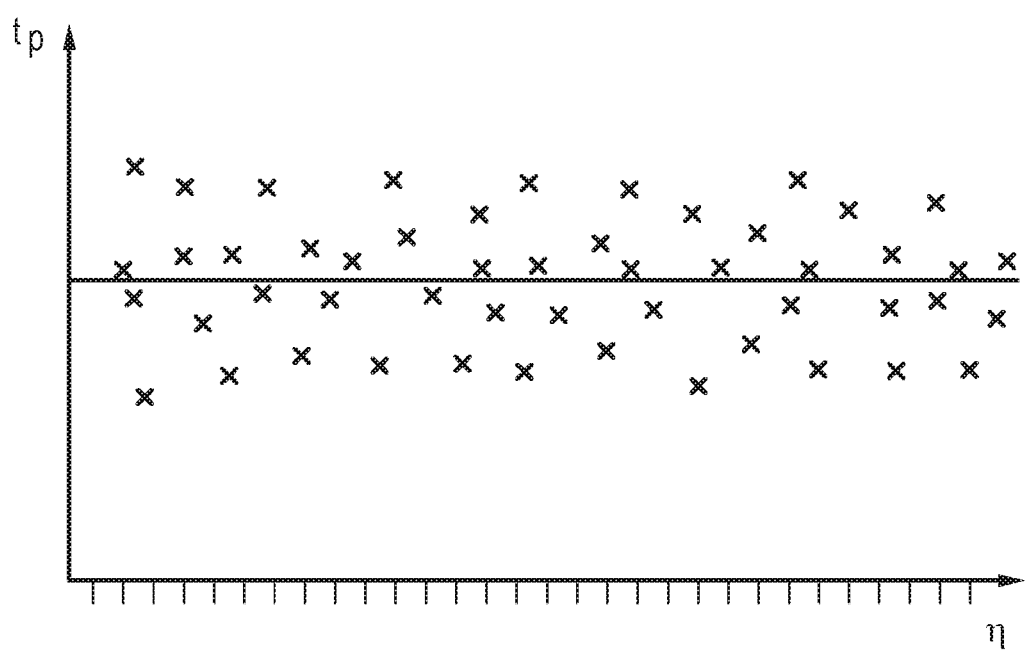
FIG. 3 is a graph showing a determination result for period durations in the case of a high spread value.

FIGS. 2 and 3 show, by way of example, the different temporal behavior of determined period durations tP for respective different temporally successive measurement points n, where FIG. 2 illustrates a normal case with no or little signal interference, in which the spread is consequently extremely small, while FIG. 3 shows substantial spreads, which are indicative of extremely poor signal quality of the received ultrasound signals.

LIST OF REFERENCE SIGNS 1 ultrasound flow measurement device
2 vessel
3 inflow
4 outflow
5a, 5b ultrasound transducer
6a, 6b reflectors
7 measurement section
8 signal generation device
9 control device
10 third evaluation device
11 first evaluation device
12 digitization device
13 storage device
14 second evaluation device
15 comparison device
16 actioning device
17 output interface
18 EMC shielding

The invention claimed is:
1. An ultrasound flow measurement device, comprising:
a vessel through which a fluid to be measured is able to flow;
an ultrasound measurement configuration with at least one ultrasound transducer for measuring a propagation time of an ultrasound signal having a plurality of periods along a measurement section running at least partly in a direction of flow;
a controller for determining a fluid flow on a basis of the propagation time measured, wherein said controller containing:
a memory;
a signal generator configured to generate the ultrasound signal with a marker for determining the propagation time;
a first evaluator for determining a period duration of at least one of the periods of the ultrasound signal received after passing through the measurement section;
a digitizer for digitizing the ultrasound signal, an output of said digitizer is connected to an input of said first evaluator;

a second evaluator for determining a spread value of a predetermined number of last received ultrasound signals, wherein when using a period duration modification as the marker, said second evaluator is configured to exclude the periods of a received ultrasound signal that contains the marker when determining the spread value;

a third evaluator, the marker being detectable by said third evaluator;

a comparator for comparing the spread value with at least one threshold value; and an actioning device for initiating a control action, assigned to the at least one threshold value that has been exceeded, for the ultrasound flow measurement device.

2. The ultrasound flow measurement device according to claim 1, wherein said first evaluator is configured to determine the period duration of exactly one defined period of the ultrasound signal or to determine the period duration of all of the periods.

3. The ultrasound flow measurement device according to claim 1, wherein said second evaluator is configured to use exactly one period duration of a predefined period for each said ultrasound signal when determining the spread value and/or a predetermined number is 10 to 100.

4. The ultrasound flow measurement device according to claim 3, wherein the predetermined number is 40 to 70.

5. The ultrasound flow measurement device according to claim 1, wherein said first evaluator is configured to determine the period duration by detecting rising edges.

6. The ultrasound flow measurement device according to claim 1, wherein the control action that can be performed by said actioning device includes switching the ultrasound flow measurement device from a normal operating mode to a second operating mode with modified measurement behavior.

7. The ultrasound flow measurement device according to claim 6, wherein said actioning device is configured to switch back to a previous operating mode as the control action when there is a drop below a previously exceeded threshold value which led to switching to the second operating mode.

8. The ultrasound flow measurement device according to claim 6, wherein the at least one second operating mode is selected from the group consisting of:

a fail-safe operating mode with measurement performance that is reduced but that still meets a measurement quality requirement and with a more robust measurement operation with respect to signal quality losses; and a deactivation operating mode, in which measurement is deactivated.

9. The ultrasound flow measurement device according to claim 8, wherein said comparator is configured to use two threshold values, including a lower threshold value assigned to the fail-safe operating mode and an upper threshold value assigned to the deactivation operating mode.

10. The ultrasound flow measurement device according to claim 6, wherein:

said controller has an output interface; and the at least one second operating mode is selected from the group consisting of:

a fail-safe operating mode with measurement performance that is reduced but that still meets a measurement quality requirement and with a more robust measurement operation with respect to signal quality losses, namely through measurement range restriction and/or multiple measurement; and a deactivation operating mode, in which measurement is deactivated, namely the deactivation operating mode information is output via said output interface.

11. The ultrasound flow measurement device according to claim 1, wherein:

said controller has an output interface; and the control action includes storing an exceedance in said memory and/or outputting exceedance information via said output interface.

12. The ultrasound flow measurement device according to claim 1, further comprising electromagnetic compatible (EMC) shielding.

13. The ultrasound flow measurement device according to claim 12, wherein said electromagnetic compatible (EMC) shielding shield both said ultrasound measurement configuration and said controller.

14. The ultrasound flow measurement device according to claim 1, wherein the spread value is a standard deviation for predefined period durations determined using said first evaluator.

15. The ultrasound flow measurement device according to claim 1, wherein said first evaluator is configured to determine a period duration of exactly one defined period of the ultrasound signal or to determine the period duration of all of the periods, namely in a case of a digitized received signal.

* * * * *